United States Patent [19]

Watanabe

[11] Patent Number: 5,420,644
[45] Date of Patent: May 30, 1995

[54] COLOR SMEAR CORRECTING APPARATUS

[75] Inventor: Akira Watanabe, Tokyo, Japan

[73] Assignee: Olympus Optical Co., Ltd., Tokyo, Japan

[21] Appl. No.: 340,481

[22] Filed: Nov. 14, 1994

Related U.S. Application Data

[63] Continuation of Ser. No. 110,755, Aug. 23, 1993, abandoned, which is a continuation of Ser. No. 762,195, Sep. 19, 1991, abandoned.

[30] Foreign Application Priority Data

Sep. 21, 1990 [JP]  Japan ................... 2-253545

[51] Int. Cl.$^6$ ............................................. H04N 5/262
[52] U.S. Cl. ..................... 348/588; 348/584; 348/578; 348/70
[58] Field of Search ............ 348/70, 578, 584, 558, 348/598, 65

[56] References Cited

U.S. PATENT DOCUMENTS

| | | | |
|---|---|---|---|
| 4,712,133 | 12/1987 | Kikuchi | 358/98 |
| 4,901,143 | 2/1990 | Uehara et al. | 358/98 |
| 4,949,179 | 8/1990 | Hosono | 358/183 |
| 4,959,710 | 9/1990 | Uehara et al. | 358/98 |
| 5,029,016 | 7/1991 | Hiyama et al. | 358/98 |
| 5,032,913 | 7/1991 | Hattori et al. | 358/26 |

*Primary Examiner*—Curtis Kuntz
*Assistant Examiner*—Minsun Oh
*Attorney, Agent, or Firm*—Armstrong, Westerman, Hattori, McLeland & Naughton

[57] ABSTRACT

In the color smear correcting apparatus of the present invention, the states of a parent picture and son picture of a video signal from a frame sequential imaging apparatus are discriminated and the color smear correction on the parent picture and the color smear correction on the son picture are independently set. Or, in the color smear correcting apparatus of the present invention, whether a moving picture or a still picture is discriminated on a parent picture and son picture of a video signal output from an endoscope apparatus including a frame sequential imaging apparatus and the color smear correction on the parent picture and the color smear correction on the son picture are independently set.

13 Claims, 9 Drawing Sheets

| STATES OF PARENT AND SON PICTURES | | MS | MM | SW |
|---|---|---|---|---|
| PARENT PICTURE SON PICTURE | MOVING | L | L | H ———<br>L |
| PARENT PICTURE SON PICTURE | MOVING STILL | L | H | H ———<br>L ——⌐— |
| PARENT PICTURE SON PICTURE | STILL MOVING | H | L | H ——⌐<br>L ——— |
| PARENT PICTURE SON PICTURE | STILL | H | H | H ———<br>L |

COLOR SMEAR CORRECTING APPARATUS

This application is a continuation of application Ser. No. 08/110,755, filed Aug. 23, 1993, now abandoned, which is a continuation of application Ser. No. 07/762,195, filed Sep. 19, 1991, now abandoned.

BACKGROUND OF THE INVENTION

1. Field of the Invention

This invention relates to a color smear correcting apparatus wherein, for a video signal of parent and son pictures input from a frame sequential imaging apparatus, the color smear of the parent picture and the color smear of the son picture are corrected independently.

2. Description of Related Art

There exists in the prior art an optical endoscope wherein an illuminating light emitting means is built-in on the tip side of an elongate insertable part, and an imaging means for imaging an object image illuminated by the illuminating light emitting means is also built-in.

Also, recently, there is practiced an electronic endoscope is known wherein such solid state imaging device as a CCD is built-in on the tip side of an insertable part so that an object image may be color-displayed in a display and may be easily recorded and reproduced in such a recording apparatus as a VTR.

Now, in the above mentioned electronic endoscope, in order to obtain a color image of an object to be imaged, there is adopted in some cases a so-called frame sequential color imaging system wherein the outside diameter of the tip part is prevented as much as possible from being made larger by a solid state imaging device housed in the tip part of the insertable part.

In this frame sequential color imaging system, an object to be imaged is sequentially illuminated with an illuminating light of a different wavelength region, the sequentially illuminated object is sequentially imaged by a monochromatic imaging device and the image signals are synthesized to obtain a color image signal so that there may be obtained a color image of a higher resolution with an imaging device of a number of pixels smaller than in the case of a color imaging device using an optical color separating filter.

On the other hand, in the above mentioned frame sequential color imaging system, when the object moves, a color image having a color smear will be reproduced and therefore, in the case where the display picture is to be switched from a still picture to a moving picture, it will be necessary to detect and correct the color smear.

Also, in the case that the display picture is to be switched from a moving picture to a still picture, if the switching operation from the moving picture to the still picture is made at the time point when the positions of the object and imaging apparatus are moving relative to one another, a color smear will be generated in the still picture.

Therefore, in U.S. Pat. No. 4,901,143, there is disclosed a technique wherein the moved amount of an image signal is detected and is judged as to whether it is adapted to the memorizing conditions of the image signal for a still picture and, when it is judged to be adapted to the memorizing conditions, an actual image signal will be memorized to obtain a clear still picture.

However, with the recent development of video signal A/D converters, digital IC's and semiconductor memory devices, such various image processes as freezing images and dividing pictures have become compatible. As disclosed, for example, in U.S. Pat. No. 4712133, one display picture is divided into two display regions of a parent picture and son picture so as to generally visibly display information necessary for the diagnosis.

In such a case, a color smear for an image by the above mentioned frame sequential color imaging system will be corrected on the entire display picture. Therefore, heretofore, even in case one display picture is divided to display parent and son pictures so that one side may be a still picture and the other side may be a moving picture, the color smear has been corrected on both sides and, as a result, either the parent picture, which is a still picture, or the son picture has been deteriorated in the picture quality by the color smear correction and has likely become an unnatural picture.

SUMMARY OF THE INVENTION

An object of the present invention is to provide a color smear correcting apparatus wherein, on a video signal of parent and son pictures input from a frame sequential imaging apparatus, the color smear of the parent picture and the color smear of the son picture can be corrected independently in response to the states of the parent picture and son picture.

Another object of the present invention is to provide a color smear correcting apparatus wherein, on a frame sequential imaging apparatus, the deterioration of the picture quality by the color smear correction is prevented so that a naturally visible picture may be obtained.

Another further object of the present invention is to provide a color smear correcting apparatus wherein parent and son pictures formed by a video signal from an endoscope apparatus including a frame sequential imaging apparatus, are made a moving picture and still picture which are both of visible images so that an accurate diagnosis may be made.

Briefly, the color smear correcting apparatus of the present invention comprises a means for outputting a discriminating signal corresponding to the states of a parent picture and a son picture of a video signal from a frame sequential imaging apparatus and a means for independently setting the color correction on the above mentioned parent picture and the color correction on the above mentioned son picture by the above mentioned discriminating signal.

The other features and advantages will become apparent enough with the following description.

BRIEF DESCRIPTION OF THE DRAWINGS

FIG. 1 is a schematic formation diagram of a color smear correcting apparatus.

FIG. 2 is a formation diagram of a color smear correcting circuit.

FIG. 3 is an essential part circuit diagram of a color smear suppressing part.

FIG. 4 is a circuit diagram of a switching timing generating part.

FIG. 5 is an explanatory view of a mode generating part.

FIG. 6 is a circuit diagram of a switching signal controlling part.

FIG. 7 is an explanatory view showing a switching timing of a color smear correction on a parent picture and son picture.

FIG. 8 is an explanatory view showing the relation between a mode signal and video switching signal.

FIG. 9 is a formation view of an electronic endoscope apparatus.

FIG. 10 is a formation view of a color smear correcting apparatus.

FIG. 11 is an essential part circuit diagram of a color smear suppressing part.

FIG. 12 is a formation view of a color smear correcting apparatus.

FIG. 13 is a circuit diagram of a son picture movement sensing part.

FIG. 14 is a circuit diagram of a parent picture movement sensing part.

DETAILED DESCRIPTION OF THE PREFERRED EMBODIMENTS

FIGS. 1 to 9 show the first embodiment of the present invention. First of all, a color smear correcting apparatus shall be schematically explained with reference to FIG. 1. This color smear correcting apparatus comprises a color smear suppressing part M1 as a means for correcting color smears, a parent and son picture state discriminating part M2 as a means for discriminating the states of parent and son pictures and a switching timing setting part M3 and video signal switching part M4 as means for setting a color smear correction.

In the above mentioned color smear suppressing part M1, a color smear of a video input (signal) from a frame sequential imaging apparatus (for example, see the later described FIG. 9) is suppressed and the video signal having had the color smear corrected is output to the above mentioned video signal switching part M4.

In the above mentioned parent and son picture state discriminating part M2, the states of a parent picture and son picture are discriminated and a mode signal as a discriminating signal showing whether each picture is a moving picture or a still picture is generated and is output to the above mentioned switching timing setting part M3.

In the above mentioned switching timing setting part M3, a timing signal showing on which of the parent picture and the son picture the color smear is to be suppressed is generated and is output to the above mentioned video signal switching part M4.

In the above mentioned video signal switching part M4, a video input signal from the above mentioned frame sequential imaging apparatus, that is, an original video input signal and a video signal having had the color smear corrected from the above mentioned color smear suppressing part M1 are switched over to each other by a timing signal from the above mentioned switching timing setting part M3 and are output.

As a result, for example, in case the parent picture and son picture are different from each other in the state, the video signal having had the color smear corrected and the original video input signal will be switched over to each other in the above mentioned video signal switching part M4 at each displaying timing of the parent picture and son picture and a video output (signal) having had the color smear corrected independently on the parent picture and son picture will be obtained.

An example of applying this color smear correcting apparatus to an endoscope apparatus shall be explained in the following with reference to FIG. 9.

Figure 9:
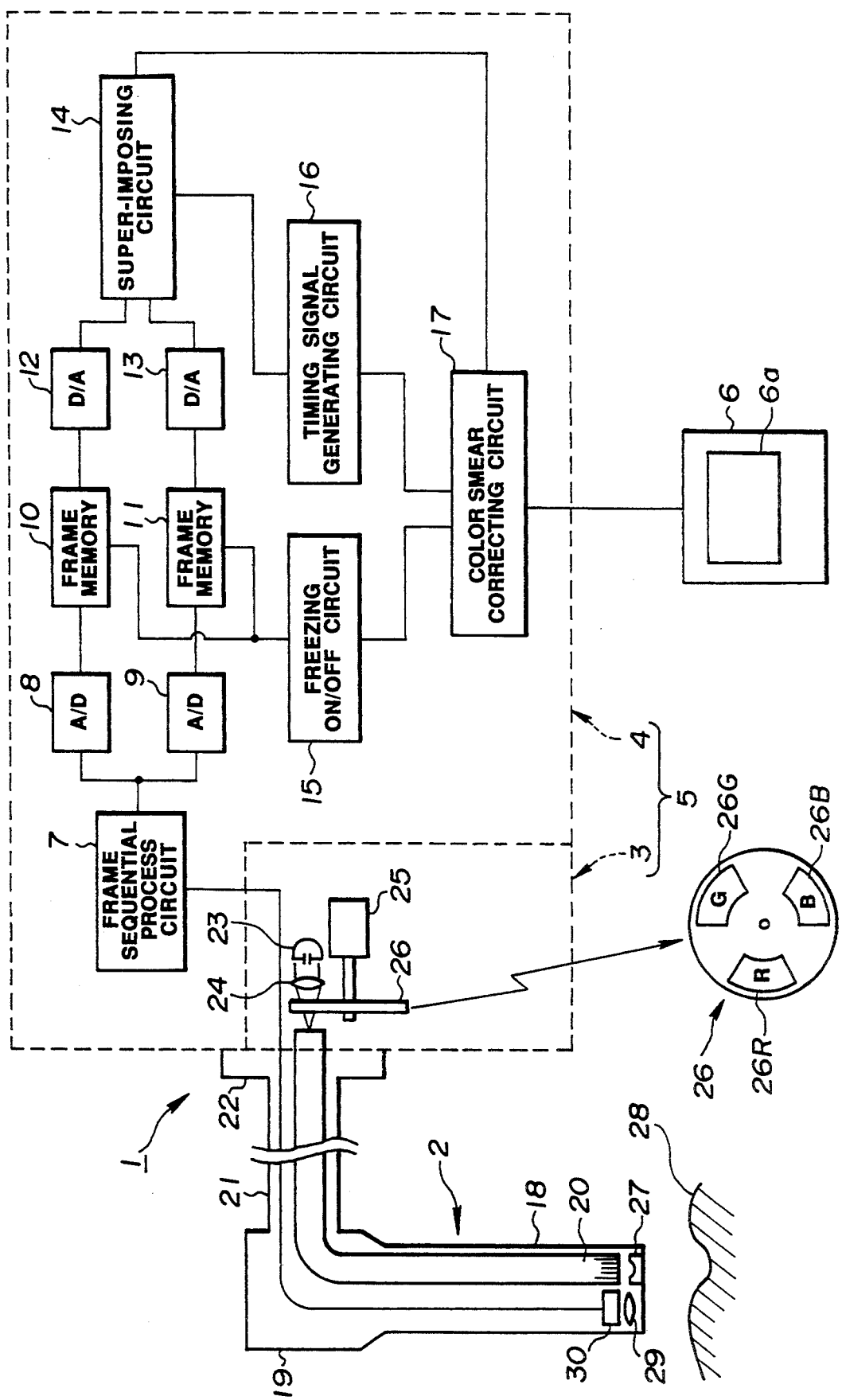

In FIG. 9, an endoscope apparatus 1 comprises a frame sequential electronic scope 2, a video processor 5 having a frame sequential light source apparatus 3 feeding this electronic scope 2 with a frame sequential illuminating light and an image processing apparatus 4 built-in and a monitor 6 color-displaying the video signal output from this video processor 5.

The above mentioned electronic scope 2 has an elongate insertable part 18 and has a thick operating part 19 formed at the rear end of this insertable part 18. A light guide 20 for transmitting an illuminating light is inserted through the above mentioned insertable part 18, is further inserted through a universal cord 21 extended out of the above mentioned operating part 19 and is connected to the above mentioned video processor 5 through a connector 22 at the end of this universal cord 21.

The above mentioned light source apparatus 3 comprises a lamp 23 emitting a white light, a condensing lens 24 condensing the light from this lamp 23 and projecting it into the above mentioned light guide 20 at the entrance end and a rotary filter 26 provided between this condensing lens 24 and the above mentioned light guide 20 and rotated and driven by a motor 25. The above mentioned rotary filter 26 is formed of filters 26R, 26G and 26B transmitting respective colors of R, G and B as arranged on a disc-like framework in the peripheral direction.

The light emitted from the above mentioned lamp 23 is condensed by the above mentioned condensing lens 24, is transmitted through the above mentioned rotary filter 26 so as to be time-serially separated into the lights of the respective wavelength regions of R, G and B and is projected into the light guide 20 at the entrance end. Then, this frame sequential illuminating light is radiated to an object to be imaged through the above mentioned light guide 20 and a light distributing lens 27.

As a result, the image of the object 28 illuminated by the illuminating light through the above mentioned light distributing lens 27 is formed on a CCD 30 arranged in the focal plane of an objective lens 29 by the objective lens 29 fitted to the tip part of the above mentioned insertable part 18 and the signal photoelectrically converted by this CCD 30 is input into an image processing apparatus 4 within the above mentioned video processor 5.

The above mentioned image processing apparatus 4 comprises a frame sequential process circuit 7, A/D converters 8 and 9, a parent picture frame memory 10, a son picture frame memory 11, D/A converters 12 and 13, super-imposing circuit 14, a freezing ON/OFF circuit 15 for switching a still picture and moving picture over to each other, a timing signal generating circuit 16 and a color smear correcting circuit 17 as a color smear correcting apparatus.

The output signal from the above mentioned CCD 30 is detected by the frame sequential process circuit 7, is subjected to such various signal processes as an AGC (autogain control) and γ correction and is then converted to digital signals by the A/D converters 8 and 9 and the digital signals are stored in the respective frame memories 10 and 11 as image data corresponding to R, G and B.

The image data of the respective frame memories 10 and 11 are converted to analog signals by the D/A converters 12 and 13 and are input into the above-mentioned super-imposing circuit 14. In this super-imposing circuit 14, the signal corresponding to the parent picture and the signal corresponding to the son picture are synthesized with each other and the vertical synchronizing signal VD and horizontal synchronizing signal HD from the above mentioned timing signal generating circuit 16 are added to the synthesized signal to produce a composite video signal which is then output to the above-mentioned monitor 6 through the above mentioned color smear correcting circuit 17.

Figures 7, 8:
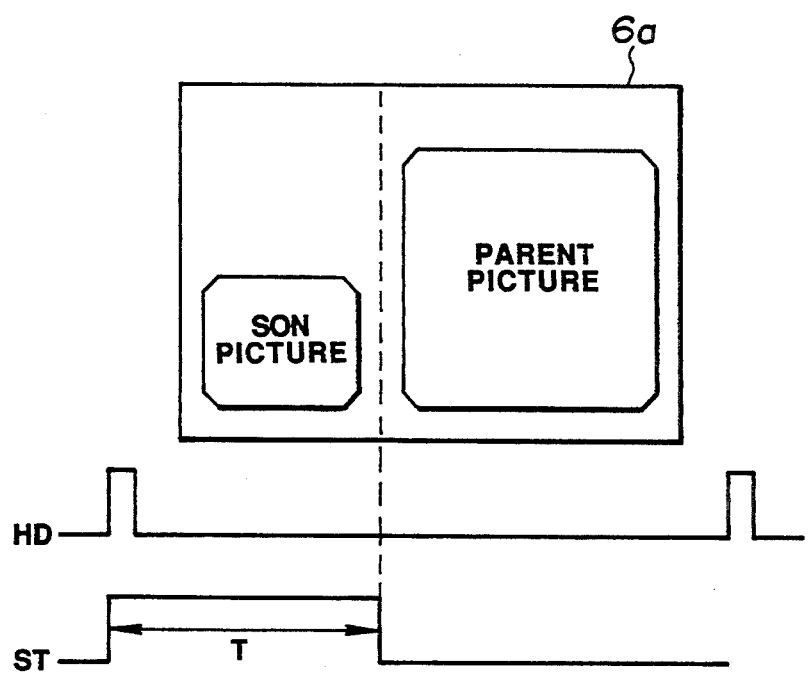

As a result, as shown in the upper part of FIG. 7, the son picture is displayed within a small displaying frame in the front half part of scanning and the parent picture is displayed within a displaying frame in the rear half part of scanning.

In case, for example, the parent picture is a still picture and the son picture is a moving picture by the signal from the above mentioned freezing ON/OFF circuit 15, the image data within the above mentioned son picture frame memory 11 will be renewed and read out at each predetermined timing but, on the other hand, the image data within the parent picture frame memory 10 will be kept constant.

Figure 1:
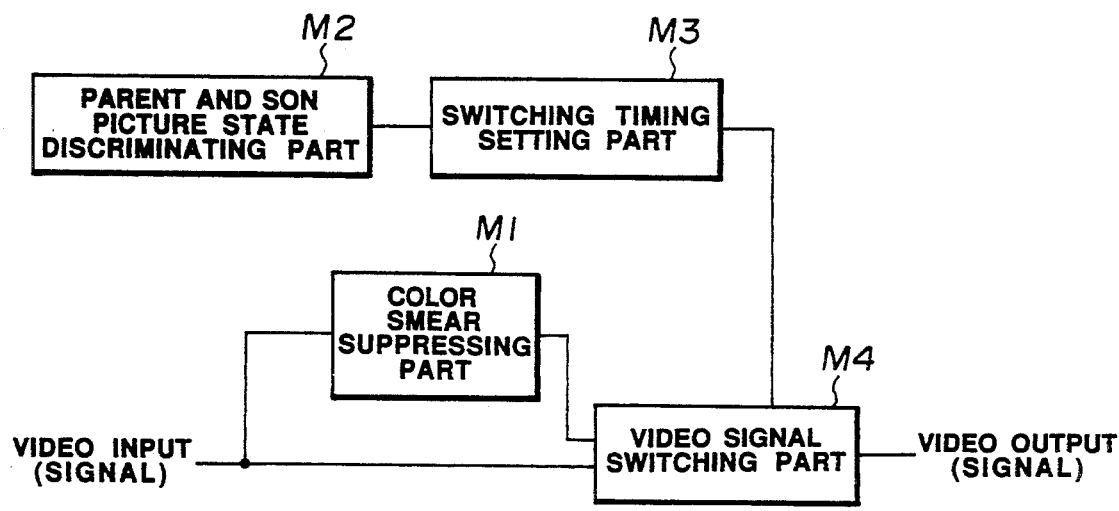
FIGS. 1 to 9 show the first embodiment of the present invention.
Figure 2:
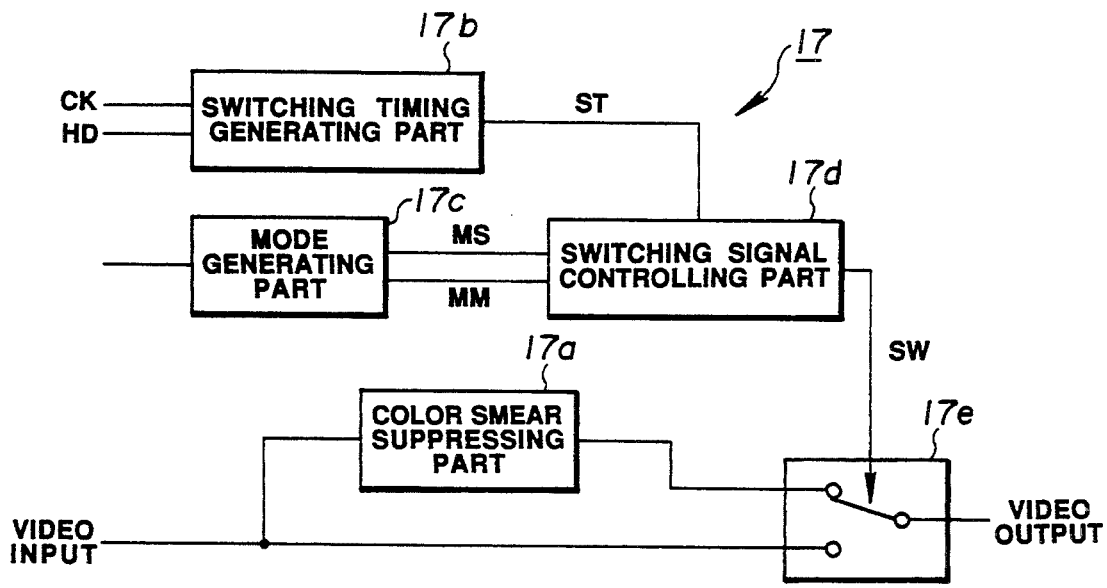

On the other hand, as shown in FIG. 2, the above-mentioned color smear correcting circuit 17 comprises a color smear suppressing part 17a, a switching timing generating part 17b, a mode generating part 17c, a switching signal controlling part 17d and a switch 17e. Against the schematic formation diagram shown in FIG. 1, the color smear suppressing part 17a corresponds to the above mentioned color smear suppressing part M1, the mode generating part 17c corresponds to the above-mentioned parent and son picture state discriminating part M2, the switching timing generating part 17b and switching signal controlling part 17d correspond to the above mentioned switching timing setting part M3 and the switch 17e corresponds to the above mentioned video signal switching part M4.

The video input signal from the above mentioned super-imposing circuit 14 is input into the above mentioned color smear suppressing part 17a. The video signal having had the color smear corrected by this color smear suppressing part 17a and the video input signal from the above-mentioned super-imposing circuit 14, that is, the original video input signal are input into the above mentioned switch 17e.

The above mentioned switch 17e operates, for example, to output the video signal having had the color smear corrected from the color smear suppressing part 17a by a high level signal and to output the original video input signal from the above-mentioned super-imposing circuit 14 by a low level signal.

In case the states of the parent picture and son picture are different from each other, these signals will be switched by the above mentioned switch 17e at each predetermined timing and will be output to the monitor 6 so that, when one of the parent picture and son picture is displayed by the video signal having had the color smear corrected, the other will be displayed by the original video input signal.

A concrete circuit formation example of the above-mentioned color smear correcting circuit 17 shall be explained below.

Figure 3:
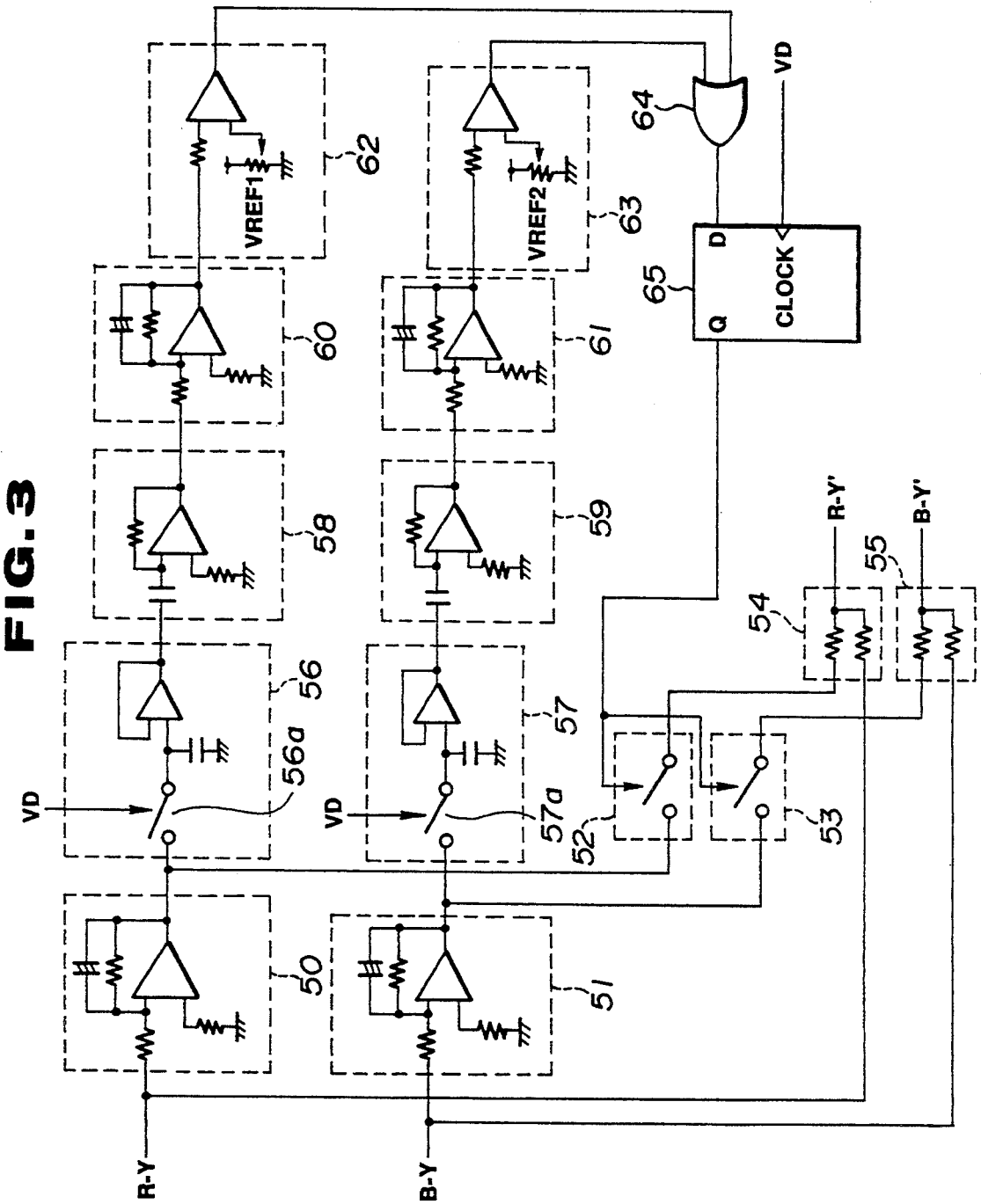

The circuit of the essential part of the above-mentioned color smear suppressing part 17a is shown in FIG. 3. When color difference signals R−Y and B−Y are separated and taken out of an original video signal by a color signal separating circuit and color difference signal demodulating circuit not illustrated, these color difference signals R−Y and B−Y will be input respectively into integrating circuits 50 and 51 comprising operational amplifiers.

The outputs of the above-mentioned integrating circuits 50 and 51 are input respectively into adding circuits 54 and 55 through switches 52 and 53. The color difference signals of the original video signal, that is, the original color difference signals R−Y and B−Y are input respectively into these adding circuits 54 and 55.

The output of the above-mentioned integrating circuit 50 is input into a sample holding circuit 56 comprising a switch 56a switched ON/OFF by a vertical synchronizing signal VD and an operational amplifier. Further, the output of this sample holding circuit 56 is input into a comparator 62 through a differentiating circuit 58 comprising an operational amplifier and an integrating circuit 60 comprising an operational amplifier. In this comparator 62, the output from the above-mentioned integrating circuit 60 and a reference voltage (threshold value) $V_{REF1}$ are compared with each other and the signal corresponding to the compared result is input into an OR gate 64 at one input end.

In the same manner, the output of the above-mentioned integrating circuit 51 is input into a sample holding circuit 57 comprising a switch 57a switched ON/OFF by a vertical synchronizing signal VD and an operational amplifier. The output of this sample holding circuit 57 is input into a comparator 63 through a differentiating circuit 59 comprising an operational amplifier and an integrating circuit 61 comprising an operational amplifier. In this comparator 63, the output from the above-mentioned integrating circuit 61 and a reference voltage (threshold value) $V_{REF2}$ are compared with each other and the output corresponding to the compared result is input into the OR gate 64 at the other input end.

The output of the above-mentioned OR gate 64 is input into a D input terminal of a D-flip-flop 65 in which a vertical synchronizing signal VD is fed to a CLOCK input terminal and the above-mentioned switches 52 and 53 are switched ON/OFF by the output signal from a Q output terminal.

Figure 4:
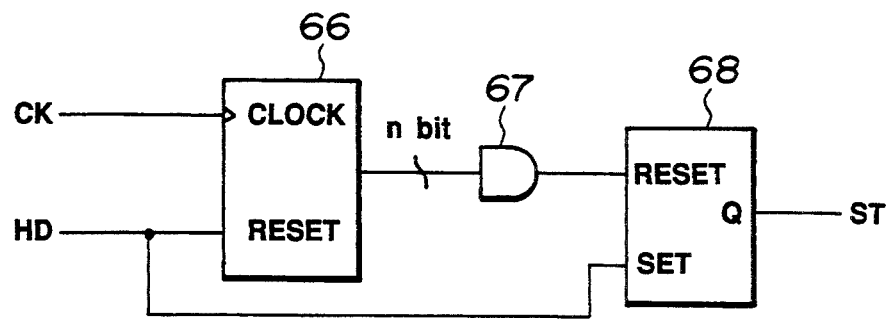

As shown in FIG. 4, the above-mentioned switching timing generating part 17b comprises a counter 66, an AND gate 67 into which n bits are input and an RS-flip-flop 68. A clock signal CK is input into the above-mentioned counter 66 at the CLOCK input terminal and a horizontal synchronizing signal HD is input into the counter 66 at the RESET terminal and into the above mentioned RS-flip-flop 68 at the SET terminal.

The n bit output of the above-mentioned counter 66 is input into the above-mentioned AND gate 67. The output of this AND gate 67 is input into the above mentioned RS-flip-flop 68 at the RESET terminal. A video switching signal ST showing the display switching of the son picture and parent picture is output to the above-mentioned switching signal controlling part 17d from the Q output terminal of the above-mentioned RS-flip-flop 68. This video switching signal ST will be a signal, for example, of a high level at the time of the son picture and of a low level at the time of the parent picture.

Figure 5:
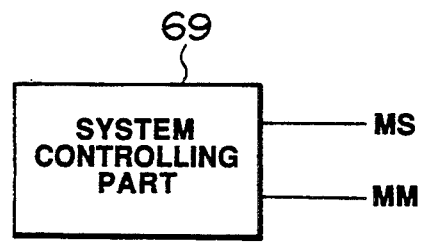

In the above-mentioned mode generating part 17c, as shown in FIG. 5, in a system controlling part 69 comprising a microcomputer or the like, the state whether each of the parent picture and son picture is a moving picture or a still picture is discriminated by a signal, for example, from the above-mentioned freezing ON/OFF circuit 15 and a mode signal MS showing the state of the parent picture and a mode signal MM showing the state of the son picture are produced and output. These mode signals MS and MM are different in the logic level depending on whether the picture state is of a still picture or moving picture and are, for example, on a high level in the still picture and on a low level in the moving picture.

Figure 6:
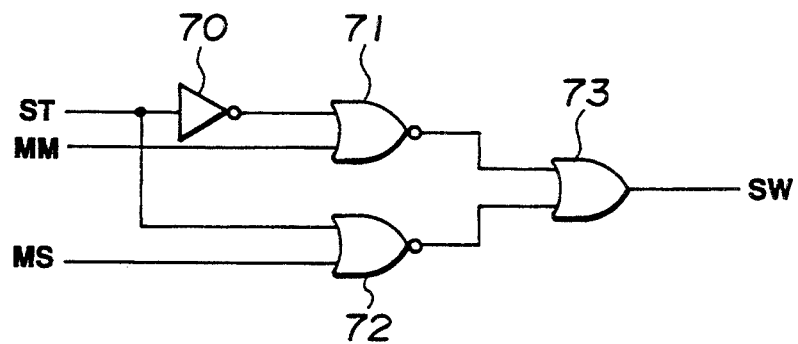

As shown in FIG. 6, the above-mentioned switching signal controlling part 17d comprises an inverter 70, NOR gates 71 and 72 and an OR gate 73. The video switching signal ST from the above-mentioned switching timing generating part 17b is inverted by an inverter 70 and is input into the above-mentioned NOR gate 71 and the mode signal MM from the above-mentioned mode generating part 17c is also input into it. On the other hand, the video switching signal ST from the above-mentioned switching timing generating part 17b and the mode signal MS from the above-mentioned mode generating part 17c are input into the above-mentioned NOR gate 72.

The outputs of the respective NOR gates 71 and 72 are input into the above-mentioned OR gate 73 and a switching signal SW for switching ON/OFF the above-mentioned switch 17e is output from the above-mentioned OR gate 73.

The switching timing of the color smear correction by the above-mentioned formation shall be explained in the following.

First of all, when the clock signal CK and horizontal synchronizing signal HD from the timing signal generating circuit 16 are input into the switching timing generating part 17b, in the circuit in FIG. 4, the counter 66 will be reset at the edge of the rise of the horizontal synchronizing signal HD, the counting of the clock signal CK will be started, the RS-flip-flop 68 will be set and the output signal of the Q output terminal, that is, the video switching signal ST will be held on a high level.

Then, after the lapse of a time T, when the predetermined counting in the above-mentioned counter 66 is completed, the coinciding output of n bits will be detected by the AND gate 67 and a signal of a high level will be applied to the above-mentioned RS-flip-flop 68 at the RESET terminal. Then, the above-mentioned RS-flip-flop 68 will be reset, the output at the Q output terminal will be inverted to a low level and, as shown in FIG. 7, the video switching signal ST to be on a low level from a high level in response to the switching to the parent picture from the son picture will be output.

At the same time, in the above-mentioned mode generating part 17c, the state whether each of the parent picture and son picture is a moving picture or a still picture will be discriminated, for example, by the signal from the above-mentioned freezing ON/OFF circuit 15 and the mode signals MS and MM will be produced and output.

When the video switching signal ST from the above-mentioned switching timing generating part 17b and the mode signals MS and MM from the above-mentioned mode generating part 17c are input into the above-mentioned switching signal controlling part 17d, in the circuit in FIG. 6, in the period when the video switching signal ST is on a high level, that is, the period when the son picture is displayed, the signal on a low level inverted by the inverter 70 will be input into the NOR gate 71, the signal on a high level will be input into the NOR gate 72, the above-mentioned NOR gate 72 will be of an output on a low level irrespective of the level of the input mode signal MS, the above-mentioned NOR gate 71 will be of an output on a high level only when the input mode signal MM is on a low level, that is, only when the son picture is a moving picture and the switch signal SW output from the OR gate 73 will be on a high level.

Also, in the period when the above-mentioned video switching signal ST is on a low level, that is, the period when the parent picture is displayed, the signal on a high level inverted by the inverter 70 will be input into the NOR gate 71, the video switching signal ST on a low level as it is will be input into the NOR gate 72, the above-mentioned NOR gate 71 will be of an output on a low level irrespective of the level of the input mode signal MM, the output of the above-mentioned NOR gate 72 will be on a high level only when the mode signal MS input into the above-mentioned NOR gate 72 is on a low level, that is, only when the parent picture is a moving picture and a switch signal SW on a high level will be output from the above-mentioned OR gate 73.

As a result, a switch signal SW having the level and timing shown in FIG. 8 will be produced in the above-mentioned switching signal controlling part 17d and will be output to the switch 17e.

On the other hand, in the color smear suppressing part 17a, in the circuit in FIG. 3, when the color difference signals R−Y and B−Y of the original video input signal are input, they will be integrated respectively by the integrating circuits 50 and 51 and average color differences will be taken out.

Further, the signals of the average color differences taken out of the original color difference signals R−Y and B−Y will be sampled and held by the vertical synchronizing signal VD through the switches 56a and 57a in the sample-holding circuits 56 and 57. Then, the sample-held signals will be differentiated respectively by the differentiating circuits 58 and 59 and then integrated respectively by the integrating circuits 60 and 61 and the varied amounts of the average color differences in the respective fields will be taken out.

These varied amounts of the average color differences in the respective fields are compared respectively with threshold values (reference voltages $V_{REF1}$ and $V_{REF2}$) by the comparators 62 and 63. In case they are larger than the threshold values, high level signals will be output and color smears will be judged to be generated.

That is to say, when a color smear is produced in the original video signal and a signal on a high level is output from at least one of the above-mentioned comparators 62 and 63, the output of the OR gate 64 will be on a high level, will be input into the D-flip-flop 65 at the D input terminal and will be latched by the vertical synchronizing signal VD and a signal on a high level will be output from the D-flip-flop 65 at the Q output terminal.

Then, the switches 52 and 53 will be switched ON to be conductive by the signal on a high level from the above-mentioned D-flip-flop 65, the average color difference signals from the above-mentioned integrating circuits 50 and 51 and original color difference signals will be added and mixed by the adding circuits 54 and 55 and will be output as color smear suppressing signals R−Y' and B−Y'. Then, by a circuit not illustrated, video signals having had color smears corrected will be recovered from these color smear suppressing signals R−Y' and B−Y'.

As a result, when the above-mentioned switch 17e is switched and connected to the above-mentioned color smear suppressing part 17a side by the high level switch signal SW, a video signal having had a color smear corrected will be output and, when the above-mentioned switch 17e is switched and connected to the original video signal side by the low level switch signal SW, the original video input signal from the above-mentioned super-imposing circuit 14 will be output as it is.

That is to say, as evident from FIG. 8, when the connected state of the above-mentioned switch 17e is set in response to whether a moving picture or still picture and the switching timing of the above-mentioned switch 17e is set between the son picture and parent picture within the horizontal synchronizing period so that the video signal having had the color smear corrected from the above-mentioned color smear suppressing part 17a and the original video input signal from the above-mentioned super-imposing circuit 14 may be switched over to each other, the son picture and parent picture will be able to independently have the color smears corrected.

Thereby, for example, in case the parent picture is a still picture and the son picture is a moving picture, if the color smear is corrected, conventionally, even the parent picture which is a still picture will have the color smear corrected, the picture quality will deteriorate and the inspection of the position to be observed will be likely to be obstructed. However, according to the present invention, such a situation can be avoided and a naturally visible image can be obtained and, in the case of an endoscope inspection, the information required for the diagnosis will be visibly displayed so that an accurate diagnosis may be made.

Figure 10:
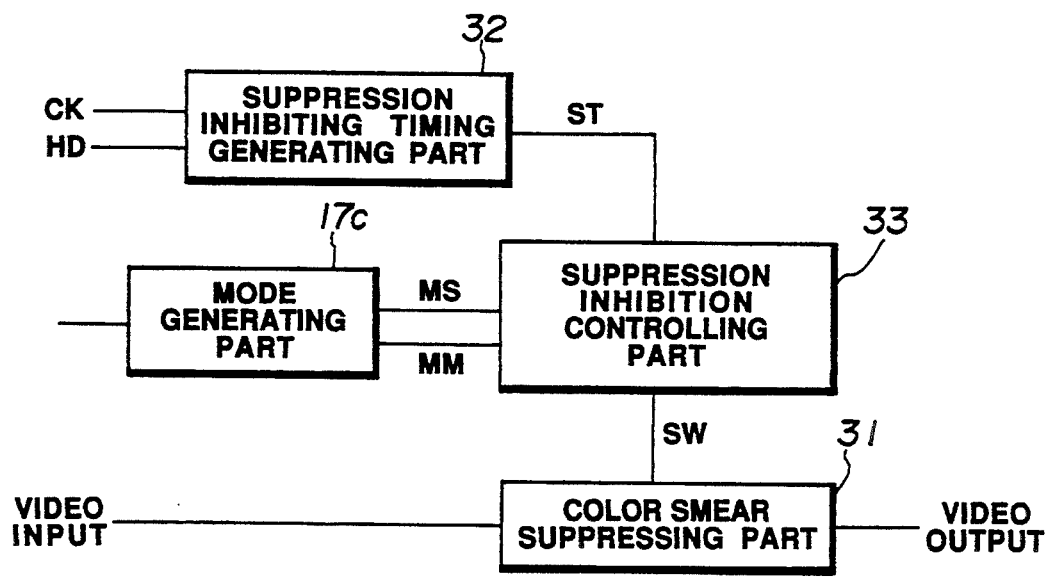
FIGS. 10 and 11 show the second embodiment of the present invention.

FIG. 10 shows the second embodiment of the present invention. The color smear correcting apparatus of this second embodiment comprises the mode generating part 17c of the above described first embodiment, a color smear suppressing part 31, a suppression inhibiting timing generating part 32 and a suppression inhibition controlling part 33.

In this second embodiment, the switch 17e in the above described first embodiment is omitted and the above-mentioned color smear suppressing part 31 is directly controlled to switch the timing of the permission and inhibition of the color smear suppressing operation.

In the above-mentioned suppression inhibiting timing generating part 32 is produced an inhibiting timing signal ST which will be on a high level when the horizontal synchronizing signal HD rises but will be on a low level after the lapse of a time T.

When this inhibiting timing signal ST and the mode signals MS and MM from the above-mentioned mode generating part 17c are input into the above-mentioned suppression inhibition controlling part 33, an inhibiting signal SW will be produced in the above-mentioned suppression inhibition controlling part 33 by these signals ST, MS and MM and will be output to the above-mentioned color smear suppressing part 31.

The above-mentioned inhibiting timing signal ST and inhibiting signal SW are signals each having the same level and timing as of the video switching signal ST and switch signal SW in the above described first embodiment and are used as color smear correction executing/-stopping signals so that the above-mentioned inhibiting signal SW may execute/stop the color smear suppressing operation of the above-mentioned color smear suppressing part 31 at a predetermined timing.

The circuit of the above described first embodiment except the above-mentioned color smear suppressing part 31 can be applied for the concrete circuits of the respective parts. The circuits in FIGS. 4 and 6 can be applied respectively to the above-mentioned suppression inhibiting timing generating part 32 and suppression inhibition controlling part 33.

Figure 11:
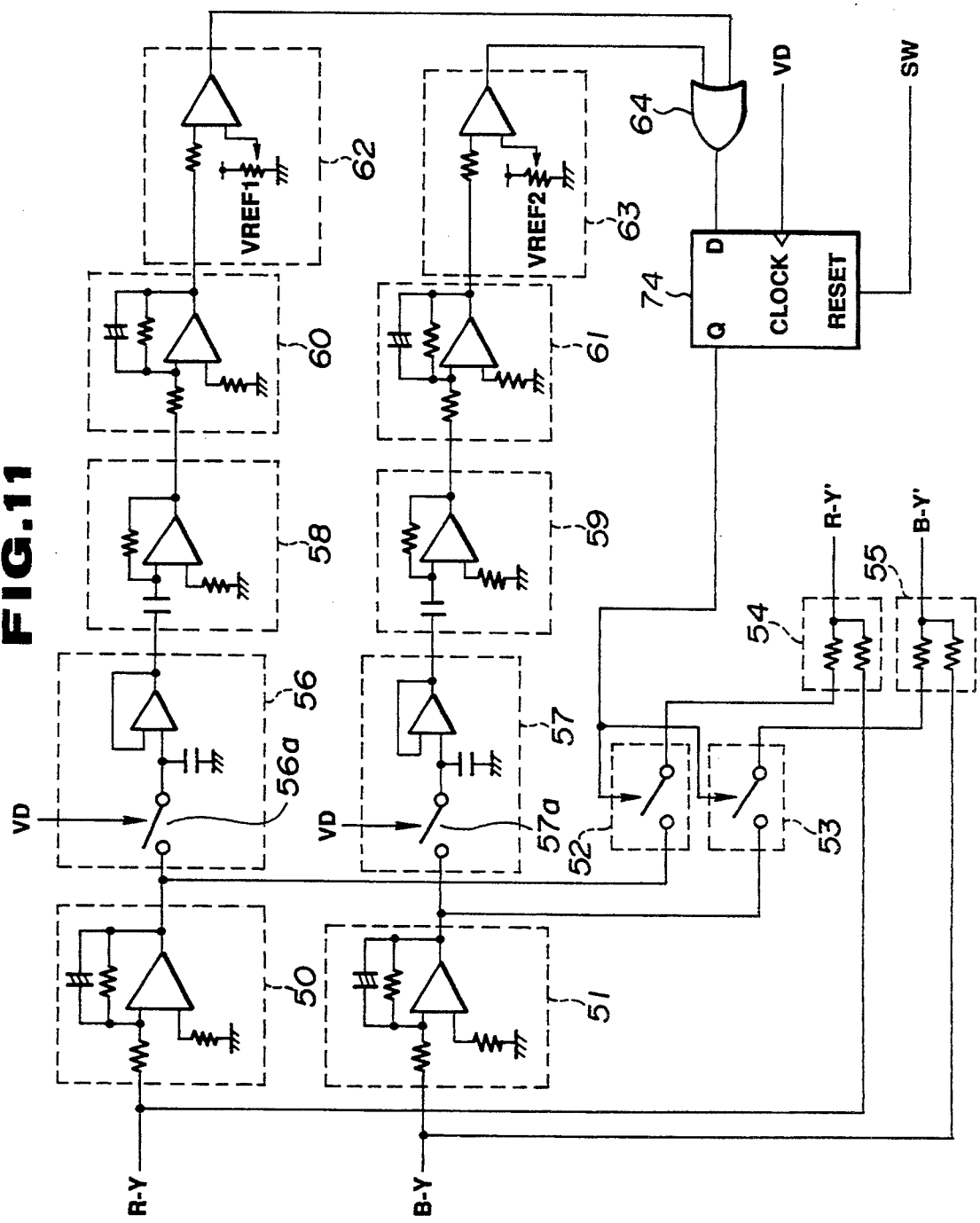

As shown in FIG. 11, a circuit in which a part of the circuit in FIG. 3 of the above described first embodiment is modified and the D-flip-flop 65 is made a D-flip-flop 74 having a RESET terminal can be applied to the above-mentioned color smear suppressing part 31. When the inhibiting signal SW from the above-mentioned suppression inhibition controlling part 33 is input into the above-mentioned D-flip-flop 74 at the RESET terminal, whether the color smear will be suppressed or not will be able to be controlled.

That is to say, when the inhibiting signal SW is on a low level, the D-flip-flop 74 will be reset, the signal from the Q output terminal will be held on a low level, the switches 52 and 53 will be interrupted to be off, the color smear suppressing operation will be inhibited and the video input signal from the frame sequential imaging apparatus will be output without having the color smear corrected.

On the other hand, when the inhibiting signal SW is on a high level, the same as in the above-described first embodiment, the color smears in the parent picture and son picture will be corrected independently of the son picture and parent picture within the horizontal synchronizing period.

The same as in the above described first embodiment, the situation that even the image inherently not required to have the color smear corrected has the color smear corrected and is deteriorated in the picture can be avoided and a natural visible image can be obtained.

Figure 12:
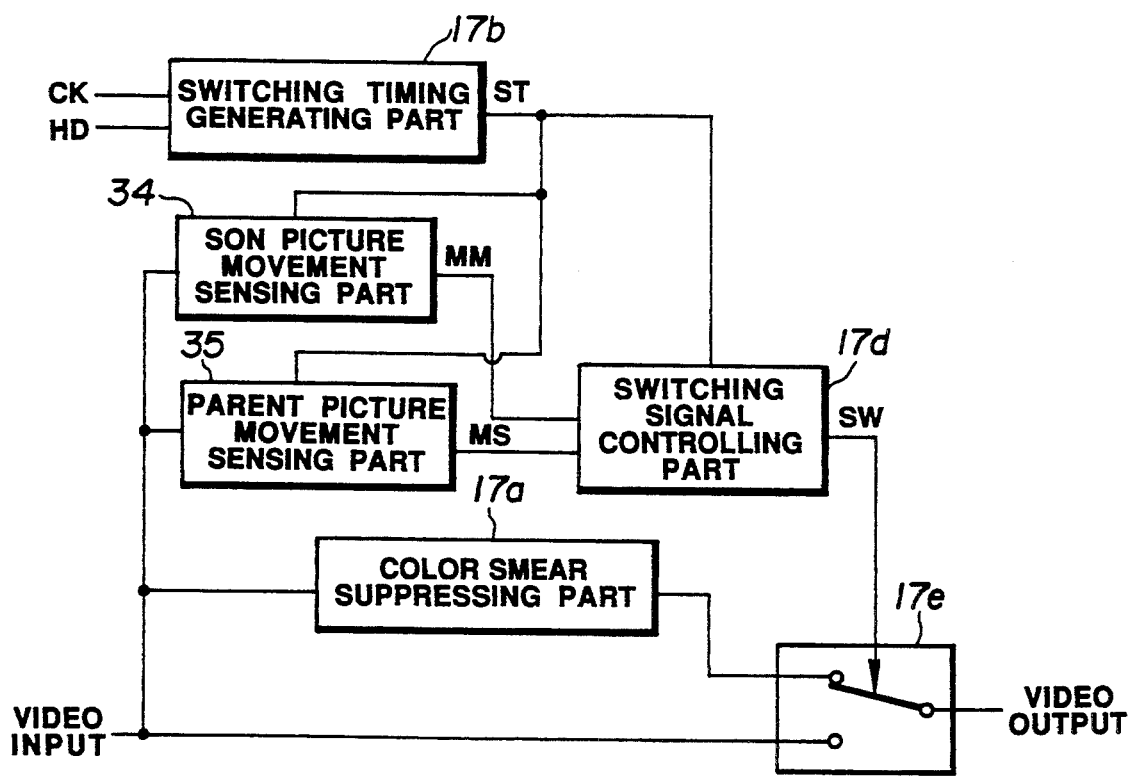
FIGS. 12 to 14 show the third embodiment of the present invention.

FIG. 12 shows the third embodiment of the present invention. In the color smear correcting apparatus of this third embodiment, the mode generating part 17c of the color smear correcting circuit 17 of the above-described first embodiment comprises a son picture movement sensing part 34 and a parent picture movement sensing part 35.

In the above-mentioned son picture movement sensing part 34, on the basis of the video switching signal ST from the switching timing generating part 17b, the state of the son picture is sensed directly from the video input signal from the frame sequential imaging apparatus and a mode signal MM corresponding to this state is generated.

Figure 13:
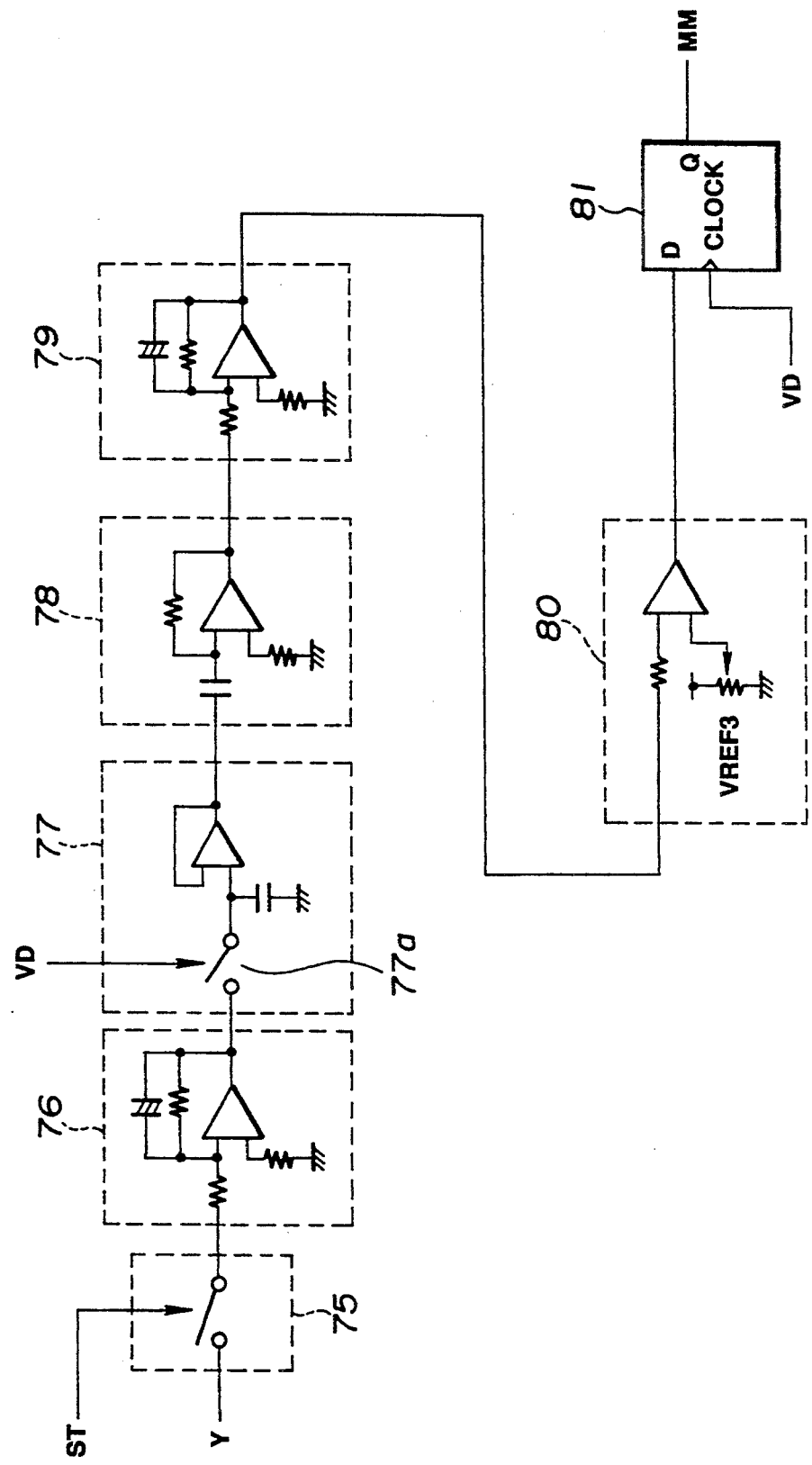

A concrete circuit example of this son picture movement sensing part 34 is shown in FIG. 13. In this circuit, a luminance signal Y separated from an original video signal not having had the color smear corrected is input into an integrating circuit 76 comprising an operational amplifier through a switch 75 switched ON/OFF by a video switching signal ST. The output of this integrating circuit 76 is input into a sample holding circuit 77 comprising a switch 77a switched ON/OFF by a vertical synchronizing signal VD and an operational amplifier. Further, the output of this sample holding circuit 77 is input into a comparator 80 through a differentiating circuit 78 comprising an operational amplifier and an integrating circuit 79 comprising an operational amplifier.

In the above-mentioned comparator 80, the output from the above-mentioned integrating circuit 79 and a reference voltage (threshold value) $V_{REF3}$ are compared with each other and the signal corresponding to the compared result is output to the D-flip-flop 81 at the D input terminal. In this D-flip-flop 81, a vertical synchronizing signal VD is fed to the CLOCK input terminal and a signal as a mode signal MM is output from the Q output terminal.

Also, in the above-mentioned parent picture movement sensing part 35, on the basis of the video switching signal ST from the above-mentioned switching timing generating part 17b, the state of the parent picture is sensed directly from the above-mentioned video input signal and a mode signal MS corresponding to this state is generated.

Figure 14:
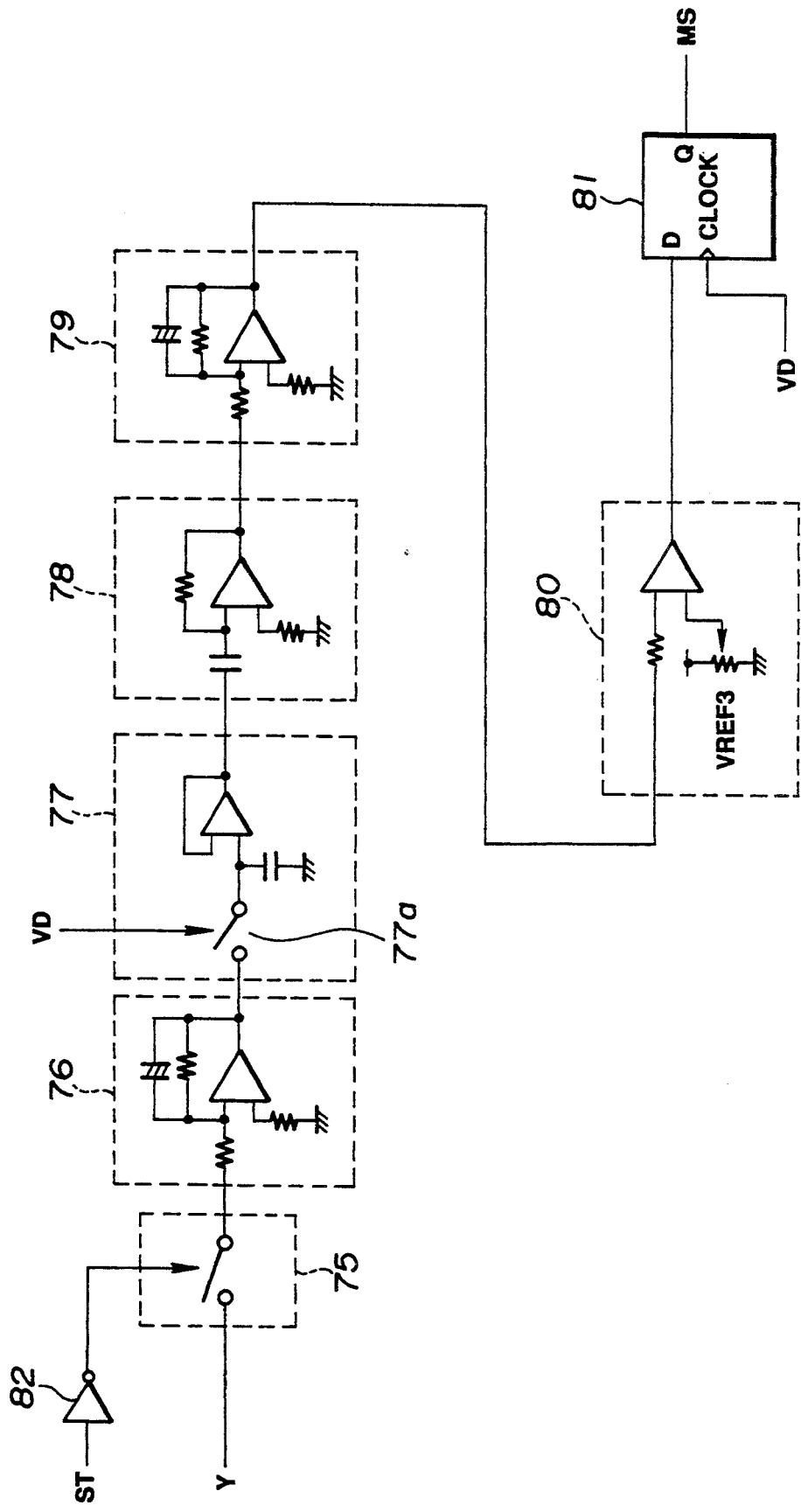

A concrete circuit example of this parent picture movement sensing part 35 is shown in FIG. 14 and is of a circuit formation wherein an inverter 82 is added to the circuit of the son picture movement sensing part 34 in the above-described FIG. 13 so that the video switching signal ST is inverted by this inverter 82 and is input into the switch 75.

A concrete circuit operation of sensing the picture state in the above son picture movement sensing part 34 and parent picture movement sensing part 35 shall be explained below.

In the son picture movement sensing part 34, in the circuit in FIG. 13, when a video switching signal ST on a high level is input, the switch 75 will be switched on, a luminance signal Y will be integrated in the integrating circuit 76 and will be sample-held by the vertical synchronizing signal VD through the switch 77a, an average of the luminance signal Y in each field will be taken out, will be further differentiated in the differentiating circuit 78 and then will be integrated in the integrating circuit 79 and the varied amount in each field of the average of the luminance signal Y will be taken out.

This varied amount in each field of the average of the luminance signal Y is compared with the threshold value (reference voltage $V_{REF3}$) in the comparator 80. As a result of the comparison, in case the above-mentioned varied amount is larger than the threshold value, the output of the above-mentioned comparator 80 will be on a low level and will be judged to be a moving picture but, in case the above-mentioned varied amount is smaller than the threshold value, the output of the above-mentioned comparator 80 will be on a high level and will be judged to be a still picture. Then, the signal from the above-mentioned comparator 80 will be input into the D-flip-flop 81 at the D input terminal, will be latched by the vertical synchronizing signal VD and will be output as a mode signal MM from the Q output terminal.

That is to say, in the above-mentioned son picture movement sensing part 34, in the period when the video switching signal ST is on a high level, that is, the period of the son picture displaying region from the rise of the horizontal synchronizing signal HD to the time T, whether a moving picture or a still picture will be sensed from the varied amount in each field of the average of the luminance signal Y. In the case of a moving picture, the mode signal MM on a low level will be output but, in the case of a still picture, the mode signal MM on a high level will be output.

On the other hand, the circuit operation of the parent picture movement sensing part 35 shown in FIG. 14 is the same as of the above described son picture movement sensing part 34 except that the video switching signal ST on a low level is inverted by an inverter 82 and the switch 75 is switched on. In the period when the video switching signal ST is on a low level, that is, the period of the parent picture displaying region after the lapse of the time T from the rise of the horizontal synchronizing signal HD, whether a moving picture or a still picture will be sensed from the varied amount in each field of the average of the luminance signal Y. In the case of a moving picture, a mode signal MS on a low level will be output but, in the case of a still picture, a mode signal MS on a high level will be output.

The other operations and effects are the same as in the above described first embodiment.

It is apparent that, in this invention, working modes different in a wide range can be formed on the basis of this invention without deviating from the spirit and scope of the invention. This invention is not restricted by its specific working modes except being limited by the appended claims.

What is claimed is:

1. A color smear correcting apparatus comprising:
   means for outputting a discriminating signal representing whether one of the states of a parent picture and a son picture of a video signal output from a single frame sequential imaging apparatus corresponds to either a moving picture or a still picture; and
   means for independently setting a color smear correction on said parent picture and the color smear correction on said son picture, when one of said states is judged to be a moving picture on the basis of said discriminating signal.

2. A color smear correcting apparatus comprising:
   means for outputting a discriminating signal representing whether one of the states of a parent picture and a son picture of a video signal output from a single frame sequential imaging apparatus corresponds to either a moving picture or a still picture;
   means for correcting a color smear of said video signal and outputting the video signal having had the color signal smear corrected; and
   means for switching between said video signal and said video signal having had said color smear corrected at a predetermined timing, when one of said states is judged to be a moving picture on the basis of said discriminating signal.

3. A color smear correcting apparatus comprising:
   means for outputting a discriminating signal representing whether one of the states of a parent picture and a son picture of a video signal output from a single frame sequential imaging apparatus corresponds to either a moving picture or a still picture;
   means for outputting a color smear correction executing/stopping signal for executing/stopping a color smear correction on said video signal at a predetermined timing on the basis of said discriminating signal; and
   means for executing/stopping the color smear correction on said video signal by said color smear correction executing/stopping signal.

4. A color smear correcting apparatus comprising:
   means for outputting a discriminating signal representing different levels in which one of a parent picture and a son picture of a video signal output from an endoscope apparatus including a single frame sequential imaging apparatus corresponds to either a moving picture or a still picture; and means for independently setting a color smear correction on said parent picture and the color smear correction on said son picture on the basis of said discriminating signal.

5. A color smear correcting apparatus according to any one of claims 1, 2, 3 and 4 wherein said means for outputting said discriminating signal is a means for discriminating either a moving picture or a still picture from the varied amount in each field of the average of a luminance signal, and outputting a signal having a different level for representing either a moving picture or a still picture for the parent picture and the son picture.

6. A color smear correcting apparatus means for outputting a discriminating signal representing whether one of the states of a parent picture and a son picture of a video signal output from a single frame sequential imaging apparatus corresponds to either a moving picture or a still picture;

means for correcting a color smear of said video signal and outputting the video signal having had the color signal smear corrected; and means for switching between said video signal and said video signal having had said color smear corrected at a predetermined timing, when one of said states is judged to be a moving picture on the basis of said discriminating signal, wherein said means for switching between said video signal and said video signal having had the color smear corrected is a means for producing a signal having a level different in the parent picture and the son picture from the output value of a counter starting counting with a horizontal synchronizing signal as a trigger and switching said video signal and said video signal having had the color smear corrected over to each other by a signal produced on the basis of this signal and said discriminating signal.

7. A color smear correcting apparatus comprising:

means for outputting a discriminating signal representing whether one of the states of a parent picture and a son picture of a video signal output from a single frame sequential imaging apparatus corresponds to either a moving picture or a still picture;

means for outputting a color smear correction executing/stopping signal for executing/stopping a color smear correction on said video signal at a predetermined timing on the basis of said discriminating signal, wherein said means for outputting said color smear correction executing/stopping signal is a means for producing a signal having a level different in the parent picture and the son picture from the output value of a counter starting counting with a horizontal synchronizing signal as a trigger and producing and outputting said color smear correction executing/stopping signal on the basis of this signal and said discriminating signal; and means for executing/stopping the color smear correction on said video signal by said color smear correction executing/stopping signal.

8. A color smear correcting apparatus, comprising:

means for outputting a discriminating signal corresponding to the states of a parent picture and a son picture of a video signal from a single frame sequential imaging apparatus, wherein said means for outputting said discriminating signal consists of a means for discriminating either a moving picture or a still picture from the varied amount in each field of the average of a luminance signal, and outputting a signal having different levels, each level representing either a moving picture or a still picture for the parent picture and the son picture; and means for independently setting a color smear correction on said parent picture and the color smear correction on said son picture on the basis of said discriminating signal.

9. A color smear correcting apparatus, comprising:

means for outputting a discriminating signal corresponding to the states of a parent picture and a son picture of a video signal from a single frame sequential imaging apparatus, wherein said means for outputting said discriminating signal consists of a means for discriminating either a moving picture or a still picture from the varied amount in each field of the average of a luminance signal, and outputting a signal having different levels, each level representing either a moving picture or a still picture for the parent picture and the son picture;

means for correcting a color smear of said video signal and outputting the video signal having had the color signal smear corrected; and means for switching between said video signal and said video signal having had said color smear corrected at a predetermined timing on the basis of said discriminating signal.

10. A color smear correcting apparatus, comprising:

means for outputting a discriminating signal corresponding to the states of a parent picture and a son picture of a video signal from a single frame sequential imaging apparatus, wherein said means for outputting said discriminating signal consists of a means for discriminating either a moving picture or a still picture from the varied amount in each field of the average of a luminance signal, and outputting a signal having different levels, each level representing either a moving picture or a still picture for the parent picture and the son picture, means for outputting a color smear correction executing/stopping signal for executing/stopping a color smear correction operation on said video signal at a predetermined timing on the basis of said discriminating signal; and means for executing/stopping the color smear correction on said video signal by said color smear correction executing/stopping signal.

11. A color smear correcting apparatus, comprising:

means for outputting a discriminating signal corresponding to a parent picture and a son picture of a video signal output from an endoscope apparatus including a single frame sequential imaging apparatus, wherein said discriminating signal has different levels corresponding to a moving picture and a still picture, respectively, wherein said means for outputting said discriminating signal consists of a means for discriminating either a moving picture or a still picture from the varied amount in each field of the average of a luminance signal, and outputting a signal having different levels, each level representing either a moving picture or a still picture for the parent picture and the son picture; and means for independently setting a color smear correction on said parent picture and the color smear correction on said son picture on the basis of said discriminating signal.

12. A color smear correcting apparatus, comprising:
means for outputting a discriminating signal corresponding to the states of a parent picture and a son picture of a video signal from a frame sequential imaging apparatus;
means for correcting a color smear of said video signal and outputting the video signal having had the color signal smear corrected; and
means for switching said video signal and said video signal having had said color smear corrected over to each other at a predetermined timing on the basis of said discriminating signal,
wherein said means for switching between said video signal and said video signal having had the color smear corrected consists of a means for producing a signal having a level different in the parent picture and the son picture from the output value of a counter which starts counting with a horizontal synchronizing signal as a trigger and switching between said video signal and said video signal having had the color smear corrected by a signal produced on the basis of this signal and said discriminating signal.

13. A color smear correcting apparatus, comprising:
means for outputting a discriminating signal corresponding to the states of a parent picture and a son picture of a video signal from a frame sequential imaging apparatus;
means for outputting a color smear correction executing/stopping signal for executing/stopping a color smear correction on said video signal at a predetermined timing on the basis of said discriminating signal, wherein said means for outputting said color smear correction executing/stopping signal consists of a means for producing a signal having a level different in the parent picture and the son picture from the output value of a counter which starts counting with a horizontal synchronizing signal as a trigger and producing and outputting said color smear correction executing/stopping signal on the basis of this signal and said discriminating signal,
means for executing/stopping the color smear correction on said video signal by said color smear correction executing/stopping signal.

* * * * *